(12) United States Patent
Moromizato

(10) Patent No.: US 7,423,889 B2
(45) Date of Patent: Sep. 9, 2008

(54) FORWARD CONVERTER WITH SYNCHRONOUS RECTIFICATION

(75) Inventor: Eito Moromizato, Nagaokakyo (JP)

(73) Assignee: Murata Manufacturing Co., Ltd. (JP)

(*) Notice: Subject to any disclaimer, the term of this patent is extended or adjusted under 35 U.S.C. 154(b) by 0 days.

(21) Appl. No.: 11/846,275

(22) Filed: Aug. 28, 2007

(65) Prior Publication Data
US 2008/0049455 A1 Feb. 28, 2008

Related U.S. Application Data

(63) Continuation of application No. PCT/JP2006/325153, filed on Dec. 18, 2006.

(30) Foreign Application Priority Data
Feb. 9, 2006 (JP) ............................. 2006-032883

(51) Int. Cl.
*H02M 3/335* (2006.01)
(52) U.S. Cl. .................. 363/21.06; 363/21.04
(58) Field of Classification Search ............. 363/20, 363/21.01, 21.04, 21.06, 21.08, 21.14
See application file for complete search history.

(56) References Cited

U.S. PATENT DOCUMENTS

| | | | | |
|---|---|---|---|---|
| 5,734,563 A | * | 3/1998 | Shinada | ............... 363/21.06 |
| 6,064,580 A | * | 5/2000 | Watanabe et al. | ............. 363/17 |
| 6,185,114 B1 | | 2/2001 | Matsumoto et al. | |
| 6,711,039 B2 | * | 3/2004 | Brkovic | ..................... 363/127 |
| 6,940,732 B2 | * | 9/2005 | Tobita | ..................... 363/21.06 |
| 7,196,920 B2 | * | 3/2007 | Quitayen | ................... 363/127 |
| 7,304,868 B2 | * | 12/2007 | Aso et al. | ............... 363/21.06 |

FOREIGN PATENT DOCUMENTS

| | | |
|---|---|---|
| JP | 2000-262051 | 9/2000 |
| JP | 2002-238244 | 8/2002 |
| JP | 2002-345239 | 11/2002 |
| JP | 2003-164147 | 6/2003 |
| JP | 2004-282847 | 10/2004 |
| JP | 2005-80342 | 3/2005 |

OTHER PUBLICATIONS

Written Opinion.
International Search Report issued Mar. 20, 2007.

* cited by examiner

*Primary Examiner*—Matthew V Nguyen
(74) *Attorney, Agent, or Firm*—Ostrolenk, Faber, Gerb & Soffen, LLP

(57) ABSTRACT

A commutation switch turning-on control switching element is controlled with a voltage generated at a fourth coil (auxiliary coil) of a main transformer and controls application of a control voltage to a control terminal of a commutation switching element. A commutation switch turning-off control switching element is provided which is connected to the control terminal of the commutation switching element and, when the commutation switch turning-off control switching element is turned on, controls a voltage at the control terminal of the commutation switching element to turn off the commutation switching element. A control switching element drive circuit turns on the commutation switch turning-off control switching element at a time when a primary switching element is turned on.

5 Claims, 12 Drawing Sheets

(a) N14
VOLTAGE BETWEEN BOTH ENDS OF N14

(b) D6 / Q3
VOLTAGE BETWEEN ANODE OF D6 AND SOURCE OF Q3

(c) Q5 / Q3
VOLTAGE BETWEEN GATE OF Q5 AND SOURCE OF Q3

(d) Q3
VOLTAGE BETWEEN GATE AND SOURCE OF Q3

(e) Q2
VOLTAGE BETWEEN GATE AND SOURCE OF Q2

FORWARD CONVERTER WITH SYNCHRONOUS RECTIFICATION

CROSS-REFERENCE TO RELATED APPLICATIONS

This is a continuation under 35 U.S.C. §111(a) of PCT/JP2006/325153 filed Dec. 18, 2006, and claims priority of JP2006-032883 filed Feb. 9, 2006, incorporated by reference.

BACKGROUND OF THE INVENTION

1. Technical Field

The present invention relates to forward converters with synchronous rectification for use in, for example, switching power supplies.

2. Background Art

A forward converter with synchronous rectification in related art is disclosed in Japanese Patent Application No. 3339452. The circuit configuration of the forward converter with synchronous rectification disclosed in Japanese Patent Application No. 3339452 is shown in FIG. 1.

In the circuit shown in FIG. 1, when a primary switching element 2 at the primary side 4a of a transformer 4 is turned on, a rectifier-side synchronous rectifier element 5 at the secondary side is turned on by a voltage generated at a second winding 4b of the transformer 4 while a commutator-side synchronous rectifier element 6 is turned off. If the turning-off of the commutator-side synchronous rectifier element 6 is delayed, a short-circuited path is formed through the two switching elements 5 and 6. Accordingly, the forward converter with synchronous rectification is configured so as to connect a switching element 7 in series to a third winding 4c of the transformer 4 and the forward converter with synchronous rectification is also configured such that the switching element 7 is turned on with a control signal supplied through a pulse transformer 11 at a time when the primary switching element 2 at the primary side is turned on.

With the above configuration, the charge of a parasitic capacitance of the commutator-side synchronous rectifier element 6 is discharged through the switching element 7 immediately before the primary switching element 2 at the primary side is turned on to immediately turn off the commutator-side synchronous rectifier element 6, thus preventing short circuit.

In the configuration described above, the following problems become apparent particularly if the power of the forward converter with synchronous rectification (mainly, the current flowing through the forward converter with synchronous rectification) is high.

First Problem

The first problem is that the waveform of the control voltage for the commutator-side synchronous rectifier element 6 (the waveform of a voltage between the gate and source of the commutator-side synchronous rectifier element 6) is varied and can become a negative voltage.

Specifically, when the primary switching element 2 is turned off, a voltage is generated at the third winding 4c to cause a current to flow toward the gate of the commutator-side synchronous rectifier element 6, and the current flows through the parasitic diode of the switching element 7, which is turned off. Then, the parasitic capacitance between the gate and source of the commutator-side synchronous rectifier element 6 is charged and the gate voltage of the commutator-side synchronous rectifier element 6 increases to turn on the commutator-side synchronous rectifier element 6. As a result, the commutation current flows between the drain and source of the commutator-side synchronous rectifier element 6, instead of through the parasitic diode of the commutator-side synchronous rectifier element 6.

When the primary switching element 2 is turned on, a signal used for turning on the primary switching element 2, output from a control circuit 12, is also applied to the switching element 7 through the pulse transformer 11 to temporarily turn on the switching element 7 slightly before the primary switching element 2 is turned on. The parasitic capacitance between the gate and source of the commutator-side synchronous rectifier element 6 is discharged to turn off the commutator-side synchronous rectifier element 6. However, if the switching element 7 is turned on only for a short time, the parasitic capacitance cannot be sufficiently discharged and the commutator-side synchronous rectifier element 6 may not be turned off completely. Accordingly, the switching element 7 is designed so as to be turned on for a slightly long time in consideration of various variations. However, in this case, the primary switching element 2 is turned on while the switching element 7 is turned on to generate a reverse voltage at the third winding 4c and to positively discharge the charge of the parasitic capacitance of the commutator-side synchronous rectifier element 6 through the switching element 7, which is turned on. As a result, the charge of the parasitic capacitance is not only discharged but also reversely charged to generate a negative gate voltage at the commutator-side synchronous rectifier element 6.

In order to turn off the commutator-side synchronous rectifier element 6, it is sufficient to discharge the charge of the parasitic capacitance and it is not necessary to reversely charge the parasitic capacitance. Accordingly, a current flowing along a path through the parasitic capacitance, the third winding 4c, the switching element 7, and the parasitic capacitance when the parasitic capacitance is reversely charged and a current generated when the reverse charge is discharged during the subsequent cycle are useless, and causes an excessive loss due to the resistance of the current path.

Particularly in a high power direct-current (DC) to DC converter (DC-DC converter), there are cases where multiple synchronous rectifier elements are connected in parallel to each other. In such a case, a number of current paths corresponding to the number of the parallel connections exist to increase the loss by an amount corresponding to the existing current paths and to cause a considerable loss in the entire circuit.

(2) Second Problem

When the parasitic capacitance of the commutator-side synchronous rectifier element 6 is reversely charged, the current flowing through the third winding 4c causes the first winding 4a to generate a current toward the primary switching element 2. Although it seems that no problem is caused because the direction of this current is the same as that of the current flowing when the primary switching element 2 is turned on, the primary switching element 2 is not practically turned on completely (it is going to be turned on) at this stage and the primary switching element 2 has a relatively high resistance. The current is forced to be applied to the primary switching element 2 in this state, thus causing an increase in the loss.

(3) Third Problem

In the configuration shown in FIG. 1, the voltage generated at the third winding 4c is used to control the commutator-side synchronous rectifier element 6. If the load is reduced to shorten the turn-on period of the primary switching element 2, the voltage generated at the third winding 4c is decreased and, therefore, it is not possible to turn on the commutator-side synchronous rectifier element 6. Although an increase in the number of turns of the third winding 4c supposedly resolves this phenomenon, the resistance of the third winding 4c is increased by an amount corresponding to the increase in the number of turns of the third winding 4c, thus increasing the loss.

According to various aspects of the present invention, the following embodiments of a forward converter with synchronous rectification are capable of reducing the losses caused by the foregoing problems.

SUMMARY OF THE INVENTION

According to several aspects of the invention, a forward converter with synchronous rectification according to the disclosed embodiments of the present invention may be configured as follows:

A forward converter with synchronous rectification includes a transformer (T1) including a first coil and a second coil, a primary switching element (Q1) connected in series to the first coil (N11) of the transformer (T1), a choke coil (L2) connected in series to the second coil (N12) of the transformer (T1), a smoothing capacitor (C1) connected in parallel between output terminals, a rectification switching element (Q2) that is connected in series to the second coil (N12) of the transformer (T1) and that is turned on or off in synchronization with turning on or off of the primary switching element (Q1), a commutation switching element (Q3) that is turned off or on in synchronization with the turning on or off of the primary switching element (Q1) and that serves as a path through which an excitation energy of the choke coil (L2) is released when the commutation switching element (Q3) is turned on, and a switching control circuit (23) which controls the primary switching element.

The forward converter with synchronous rectification may further include a commutation switch control voltage generating circuit (41) that generates a control voltage for the commutation switching element (Q3); a commutation switch turning-on control switching element (Q5) that is controlled with a voltage generated at an auxiliary coil (N14) of the transformer (T1) and that controls application of the control voltage to a control terminal of the commutation switching element (Q3); a commutation switch turning-off control switching element (Q4) that is connected to the control terminal of the commutation switching element (Q3) and, when the commutation switch turning-off control switching element (Q4) is turned on, controls a voltage at the control terminal of the commutation switching element (Q3) to turn off the commutation switching element (Q3); and a control switching element drive circuit (24) that transmits an on-timing signal for the primary switching element (Q1) from the first side of the transformer to the second side thereof in an insulated state and that turns on the commutation switch turning-off control switching element (Q4) in response to the on-timing signal for the primary switching element, transmitted to the second side.

A driving voltage adjustment capacitor (C5) may be connected in series between the auxiliary coil (N14) of the transformer and the commutation switch turning-on control switching element (Q5).

A differentiation circuit including a capacitor (C5) and a resistor (R5) may be connected to the auxiliary coil (N14) of the transformer. An output from the differentiation circuit may be connected to a control terminal of the commutation switch turning-on control switching element (Q5).

A charging circuit including the capacitor (C5) and a diode (D5) may be connected to the auxiliary coil (N14) of the transformer. A diode (D6) for preventing application of a reverse voltage to the control terminal of the commutation switch turning-on control switching element (Q5) may be connected in series to the capacitor (C5).

A rectification switching element turning-on control switching element (Q7) may be connected between an output of the commutation switch control voltage generating circuit (41) and a control terminal of the commutation switching element (Q2). A switching element Q6 for applying a turn-on signal to a control terminal of the rectification switching element turning-on control switching element (Q7) when the primary switching element (Q1) is turned on may be connected to the control terminal of the rectification switching element turning-on control switching element (Q7). A diode (D14) for discharging the charge of a parasitic capacitance generated at the commutation switch turning-on control switching element (Q5) may be connected between the control terminal of the commutation switch turning-on control switching element (Q5) and the control terminal of the rectification switching element turning-on control switching element (Q7).

According to these embodiments of the present invention, at least the following advantages are presented:

The commutation switch control voltage generating circuit (41) is separately provided as a power supply for driving the commutation switching element (Q3), the commutation switch turning-on control switching element (Q5) is provided between the power supply and the commutation switching element (Q3), and the commutation switch turning-on control switching element (Q5) is turned on with a voltage generated at the auxiliary coil (N14) in order to turn on the commutation switching element (Q3) with a voltage supplied from the commutation switch control voltage generating circuit (41). Accordingly, since the fourth coil does not exist on the path through which the charge of the commutation switching element (Q3) is discharged and the reverse charging is not performed, the problems of the circuit disclosed in Japanese Patent Application No. 3339452 are not caused.

Consequently, the gate of the commutation switching element (Q3) does not have a negative value, thus preventing any loss due to the negative voltage.

In addition, the commutation switch turning-on control switching element (Q5) can be made considerably smaller than the commutation switching element (Q3) and the capacitance between the gate and source of the commutation switch turning-on control switching element (Q5) can be decreased. Accordingly, a reverse current flowing through the auxiliary coil (N14) is decreased to reduce any loss at the primary switching element (Q1) due to the current flowing toward the primary side.

Since a separate power supply is used as the driving power supply of the commutation switching element (Q3), it is sufficient to minimally provide the auxiliary coil (N14). Accordingly, a problem in that the commutation switching element (Q3) cannot be driven with a lighter load is not caused.

Connecting the driving voltage adjustment capacitor (C5) in series between the auxiliary coil (N14) of the transformer and the commutation switch turning-on control switching element (Q5) allows the control voltage of the commutation switch turning-on control switching element (Q5) to be correctly adjusted, thus preventing application of an excessive voltage to the gate of the commutation switch turning-on control switching element (Q5).

Connecting the differentiation circuit including the capacitor (C5) and the resistor (R5) to the auxiliary coil (N14) of the transformer and connecting the output of the differentiation circuit to the control terminal of the commutation switch turning-on control switching element (Q5) cause the output voltage from the auxiliary coil (N14) to be differentiated. Accordingly, it is possible to advance the turning on of the commutation switch turning-on control switching element (Q5) and the commutation switching element (Q3) and to shorten the period during which the commutation current flows through the parasitic diode of the commutation switching element (Q3), thus reducing any loss due to the rectification circuit.

Connecting the charging circuit including the capacitor (C5) and the diode (D5) to the auxiliary coil (N14) of the transformer, and connecting the diode (D6) for preventing application of a reverse voltage to the control terminal of the commutation switch turning-on control switching element (Q5) in series to the capacitor (C5), eliminate the charging voltage (the voltage of the cathode of the D6) to the commutation switch turning-on control switching element (Q5) when the commutation switch turning-off control switching element (Q4) is turned on. Accordingly, it is possible to shorten a time when the commutation switch turning-off control switching element (Q4) is turned on simultaneously with the turning on of the commutation switch turning-on control switching element (Q5), thus reducing any loss caused by the driving of the commutation switching element (Q3).

The rectification switching element turning-on control switching element (Q7) is connected between the output of the commutation switch control voltage generating circuit (41) and the control terminal of the rectification switching element (Q2); the switching element (Q6) for applying an turn-on signal to the control terminal of the rectification switching element turning-on control switching element (Q7) when the primary switching element (Q1) is turned on is connected to the control terminal of the rectification switching element turning-on control switching element (Q7); and the diode (D14) for discharging the charge at the control terminal of the commutation switch turning-on control switching element (Q5) is connected between the control terminal of the commutation switch turning-on control switching element (Q5) and the control terminal of the rectification switching element turning-on control switching element (Q7). Consequently, since the source of the switching element (Q6) is grounded when the switching element (Q6) is turned on at a turn-on timing of the primary switching element (Q1), the capacitance between the gate and source of the commutation switch turning-on control switching element (Q5) is discharged through the diode (D14) to turn off the Q5. At the same time, the turning on of the switching element (Q6) turns on the rectification switching element turning-on control switching element (Q7) and also turns on the rectification switching element (Q2) and the commutation switch turning-off control switching element (Q4). The charge of the control terminal (the parasitic capacitance) of the Q5 has been discharged through the diode (D14) before the commutation switch turning-off control switching element (Q4) is turned on to turn off the commutation switch turning-on control switching element (Q5), so that the problem of the simultaneous turning-on of the Q4 and the Q5 is resolved.

Other features and advantages of the present invention will become apparent from the following description of embodiments of invention which refers to the accompanying drawings.

DETAILED DESCRIPTION OF EMBODIMENTS OF THE INVENTION

Figure 1:
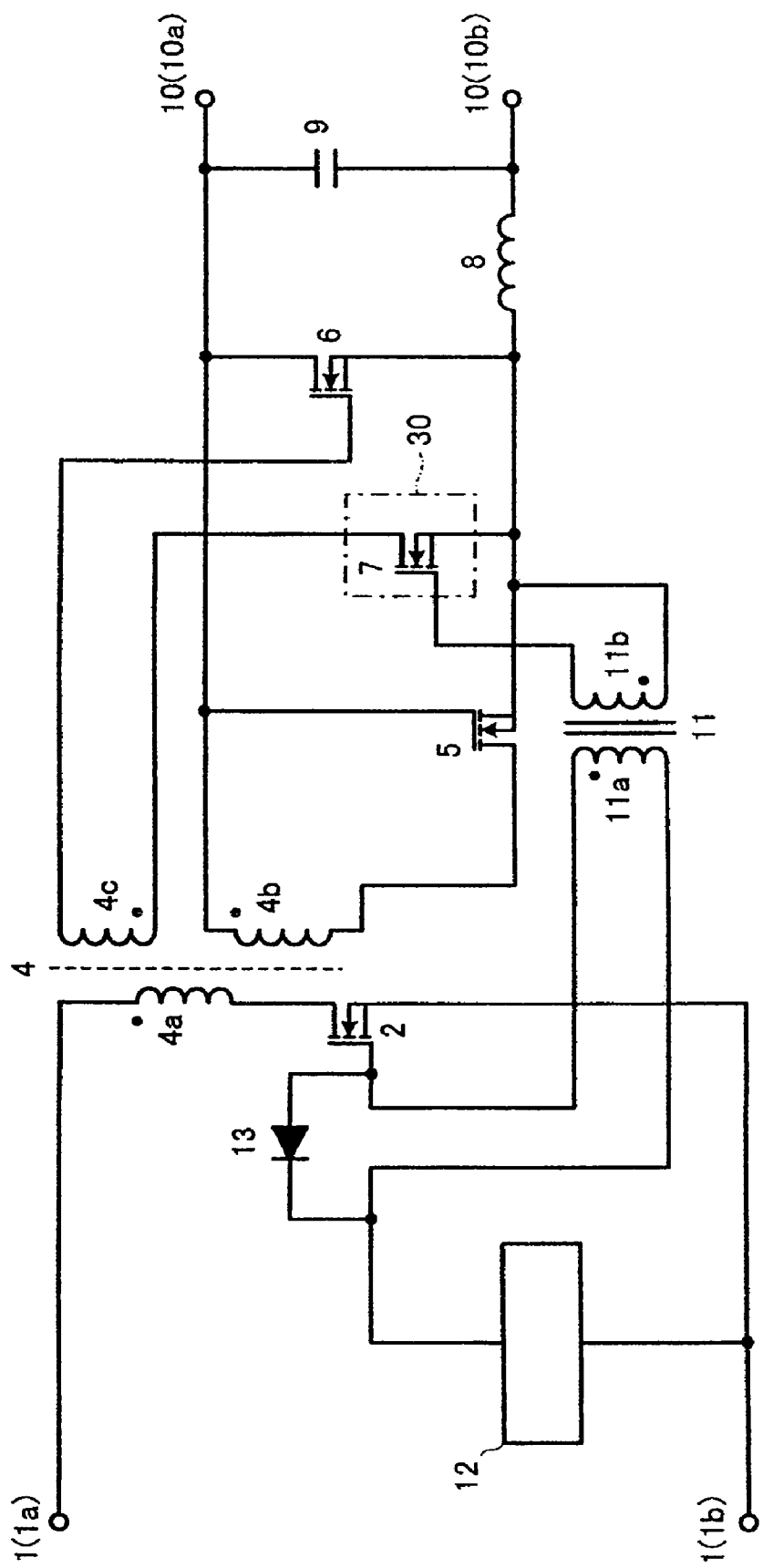
FIG. 1 is a schematic circuit diagram showing the configuration of a converter disclosed in Japanese Patent Application No. 3339452.

Reference Numerals
21 input terminals
22 third rectification smoothing circuit
23 switching control circuit
24 control switching element drive circuit
32 output terminals
41 commutation switch control voltage generating circuit
C1 smoothing capacitor
C2 capacitor
C3 capacitor
D1, D2 diodes
L1 choke coil
L2 choke coil
N11 first coil
N12 second coil
N13 third coil
N14 fourth coil
Q1 primary switching element
Q2 rectification switching element
Q3 commutation switching element
Q4 commutation switch turning-off control switching element
Q5 commutation switch turning-on control switching element
Q6, Q7 control switching elements
Q8 rectification switch control switching element
T1 main transformer
N11 first coil
N12 second coil
N13 third coil
N14 fourth coil
L1, L2 choke coils
C1 smoothing capacitor
DV driver circuit

First Embodiment

An example of the configuration of a forward converter with synchronous rectification according to a first embodiment of the present invention will now be described with reference to FIG. 2.

Figure 2:
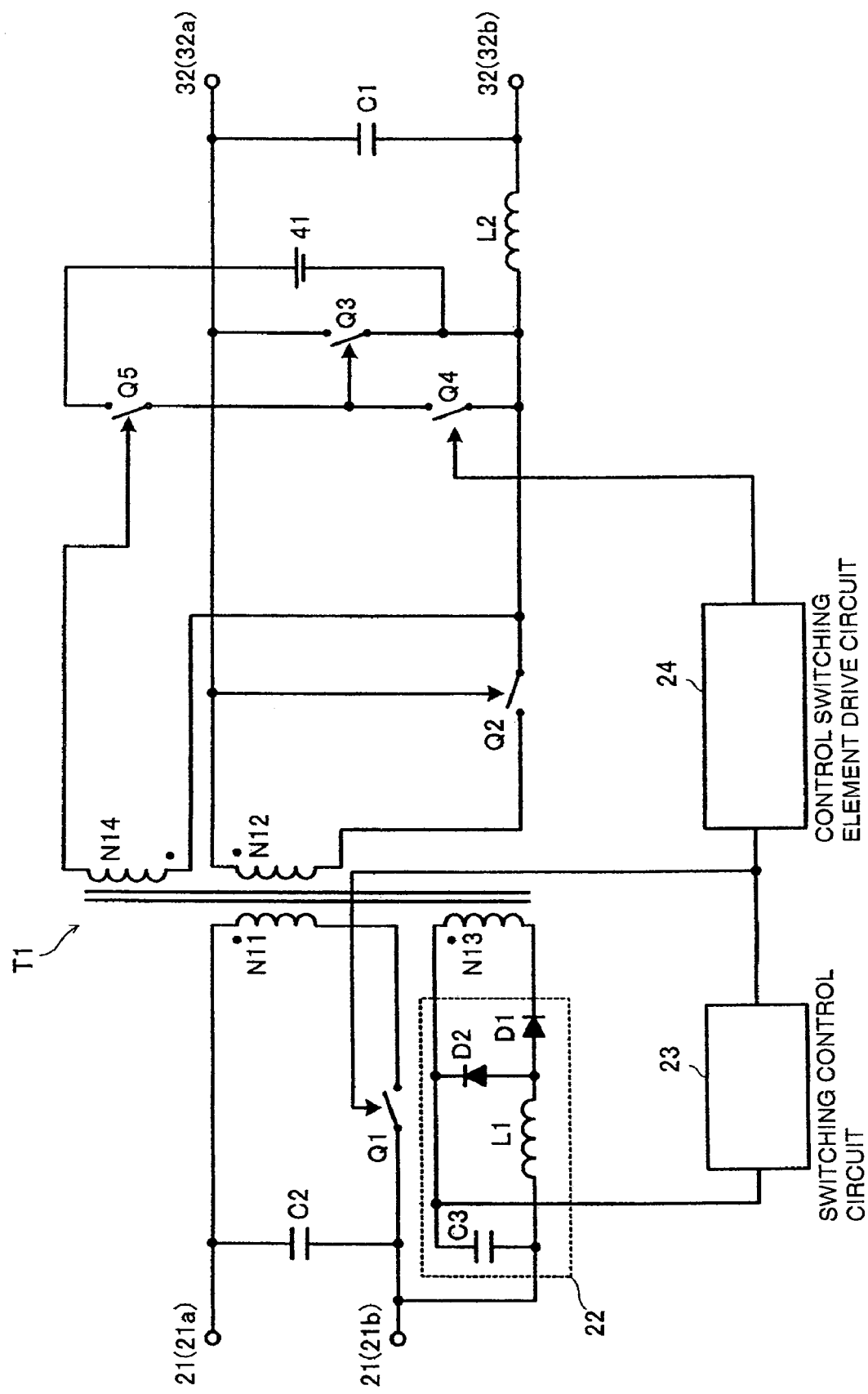
FIG. 2 is a schematic circuit diagram of a forward converter with synchronous rectification according to a first embodiment of the present invention.

FIG. 2 is a schematic circuit diagram of the forward converter with synchronous rectification, part of which is represented by blocks or symbols. As shown in FIG. 2, a main transformer T1 includes a first coil N11, a second coil N12, a third coil N13, and a fourth coil N14 (an auxiliary coil according to the claims). A primary switching element Q1 is connected in series to the first coil N11, and a capacitor C2 is connected between the input terminals 21 (21a and 21b). A choke coil L2 and a rectification switching element Q2 are connected in series to the second coil N12 of the main transformer T1, and a smoothing capacitor C1 is connected between the output terminals 32 (32a and 32b). The second coil N12, the choke coil L2, and the smoothing capacitor C1 form a loop. A commutation switching element Q3 is provided at a position on a commutation path through which an excitation energy of the choke coil L2 is released.

A third rectification smoothing circuit 22 including diodes D1 and D2, a choke coil L1, and a capacitor C3 is connected to the third coil N13 of the main transformer T1. A switching control circuit 23 receives an output from the third rectification smoothing circuit 22 as an indirect power and output-voltage detection signal and outputs a switching control signal to the primary switching element Q1.

The circuit is configured so as to apply an electromotive voltage of the second coil N12 of the main transformer T1 to the control terminal of the rectification switching element Q2.

First, when the primary switching element Q1 is turned off, the capacitance between the gate and source of a commutation switch turning-on control switching element Q5 is charged to a voltage exceeding a threshold voltage of the Q5 by a voltage generated at the fourth coil N14, to turn on the Q5. The capacitance between the gate and source of the commutation switching element Q3 is charged by a current flowing from a commutation switch control voltage generating circuit 41 through the Q5 to turn on the Q3. At this time, a commutation switch turning-off control switching element Q4 is turned off. Accordingly, the commutation switching element Q3 is kept in the turn-on state.

Next, when the primary switching element Q1 is turned on under the control of the switching control circuit 23, the rectification switching element Q2 is turned on by a voltage generated at the second coil N12 of the main transformer T1 while the commutation switching element Q3 is turned off. A control switching element drive circuit 24 receives the switching control signal for the primary switching element Q1 (an on-timing signal for the Q1), supplied from the switching control circuit 23, to drive the commutation switch turning-off control switching element Q4 in synchronization with the reception of the switching control signal. The turning-on of the commutation switch turning-off control switching element Q4 discharges the charge of the capacitance between the gate and source of the commutation switching element Q3 to force the Q3 to be turned off.

The provision of the commutation switch control voltage generating circuit 41 and the commutation switch turning-on control switching element Q5 separates the gate of the commutation switching element Q3 from the fourth coil N14. Accordingly, the gate voltage of the Q3 does not become a negative value, so that it is possible to reduce any loss caused by the driving of the Q3.

In addition, since the voltage is supplied from the commutation switch control voltage generating circuit 41, which is separated from the fourth coil N14 of the main transformer T1, it is possible to keep the control voltage of the commutation switching element Q3 constant to achieve stable control.

Second Embodiment

An example of the configuration of a forward converter with synchronous rectification according to a second embodiment of the present invention will now be described with reference to FIGS. 3 and 4.

Figure 3:
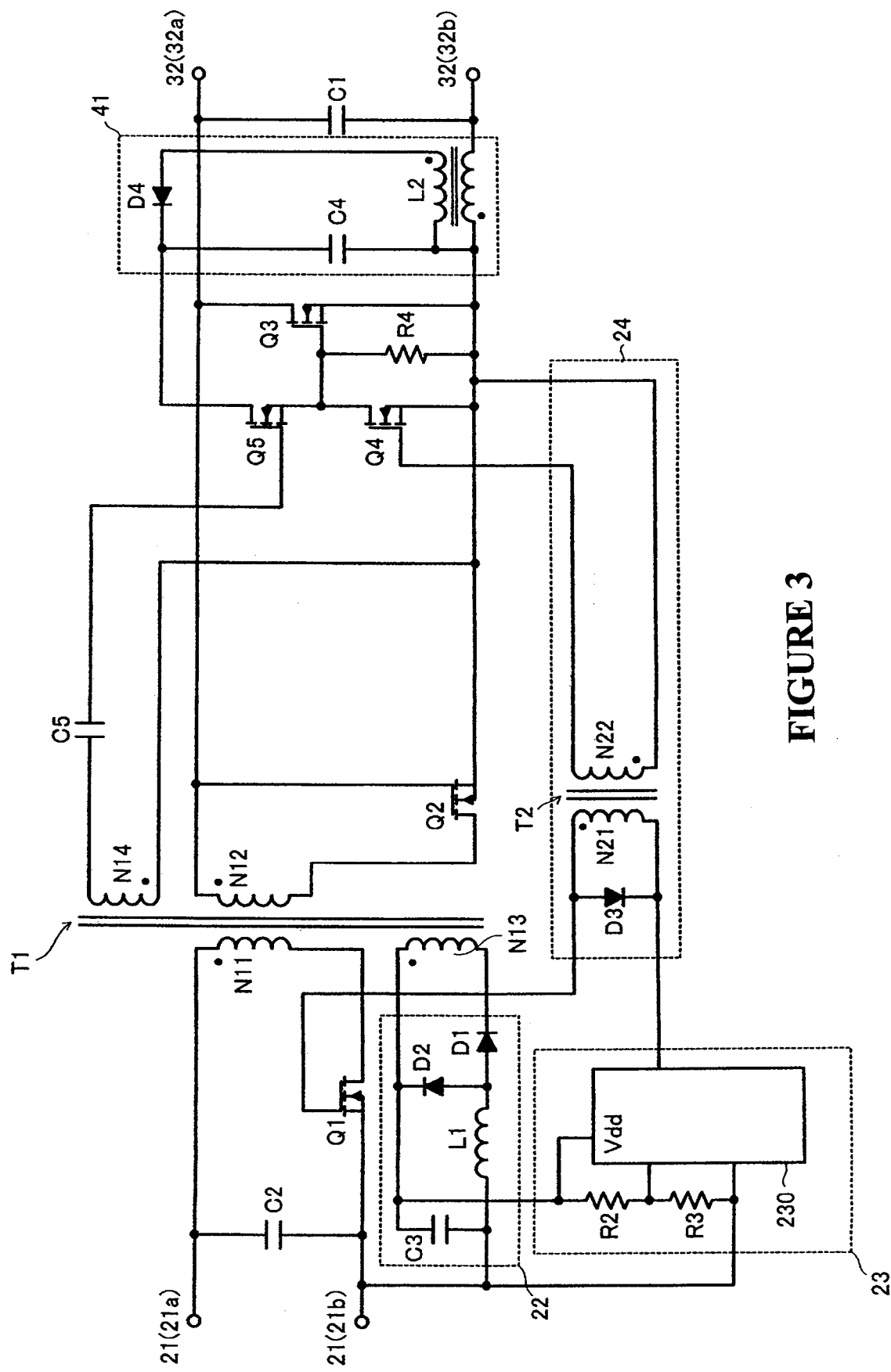
FIG. 3 is a schematic circuit diagram of a forward converter with synchronous rectification according to a second embodiment of the present invention.

FIG. 3 is a schematic circuit diagram of the forward converter with synchronous rectification according to the second embodiment of the present invention.

As shown in FIG. 3, a switching control circuit 23 is provided with a switching control integrated circuit (IC) 230 that operates by using an output from a third rectification smoothing circuit 22 as a power and that receives a divided voltage resulting from division of the output by resistors R2 and R3. The switching control IC 230 supplies a switching control signal to the gate of a primary switching element Q1 through a first coil N21 of a pulse transformer T2. The switching control circuit 23 performs pulse width modulation (PWM) control to the primary switching element Q1 such that the divided voltage is equal to a reference voltage on the basis of the received divided voltage and the reference voltage.

A diode D3 for resetting the excitation of the pulse transformer T2 is connected to the first coil N21 of the pulse transformer T2. The connection of the diode D3 in this direction causes a pulse of an on-timing signal to be output through a second coil N22 only when a signal used for turning on the primary switching element Q1 is output from the switching control circuit 23. The pulse transformer T2 and the diode D3 form a control switching element drive circuit 24.

One end of a second coil N12 is connected to the gate of a rectification switching element Q2.

A capacitor C5 is connected between one end of a fourth coil N14 of a main transformer T1 and the gate of a commutation switch turning-on control switching element Q5.

A capacitor C4 is connected to a second coil of a choke coil L2 at the secondary side through a diode D4. A series circuit including the commutation switch turning-on control switching element Q5 and a resistor R4 is connected to both ends of the capacitor C4. The circuit is configured such that the voltage between both ends of the resistor R4 is applied between the gate and source of a commutation switching element Q3.

A commutation switch turning-off control switching element Q4 is connected between the gate and source of the commutation switching element Q3.

A commutation switch control voltage generating circuit 41 rectifies the voltage of the second coil of the choke coil L2 with the diode D4, and the capacitor C4 is charged with this voltage to generate a voltage used for applying a control voltage to the commutation switching element Q3. The commutation switch control voltage generating circuit 41 is not limited to the configuration described above and may have any configuration.

The capacitor C5 is used to divide a voltage generated at the fourth coil N14 between the capacitor C5 and the capacitance between the gate and source of the commutation switch turning-on control switching element Q5 and is not essential. The remaining configuration of the circuit in FIG. 3 is basically the same as that of the circuit according to the first embodiment of the present invention.

Figure 4:
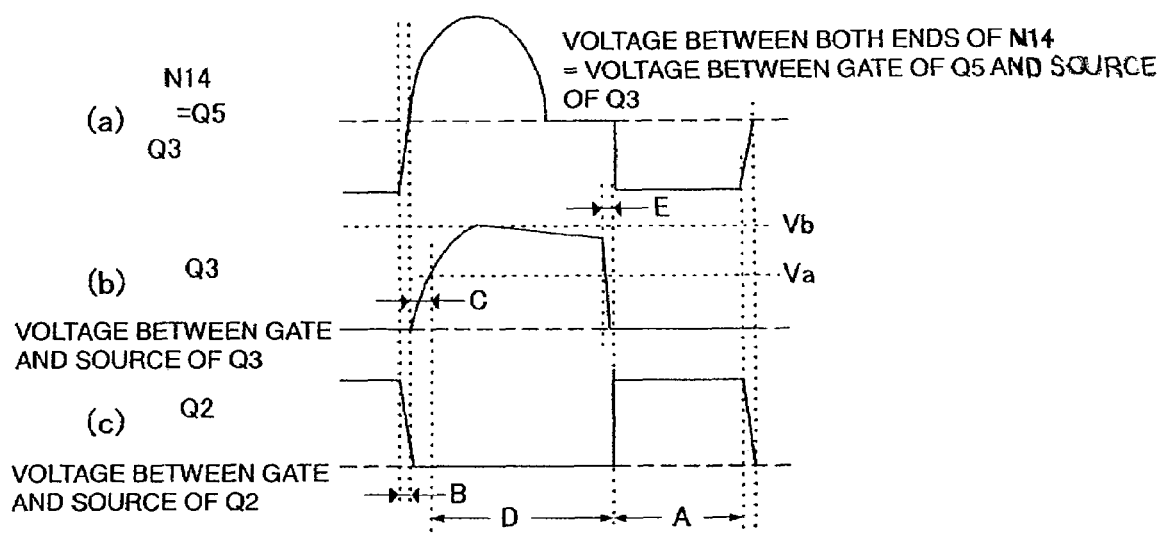
FIG. 4 includes diagrams showing waveforms of the main parts of the converter shown in FIG. 3.

FIG. 4 includes diagrams showing waveforms of the main parts of the forward converter with synchronous rectification shown in FIG. 3.

A graph (a) in FIG. 4 shows the waveform of a voltage between both ends of the fourth coil N14 of the main transformer T1. A graph (b) in FIG. 4 shows the waveform of a voltage between the gate and source of the commutation switching element Q3. A graph (c) in FIG. 4 shows the waveform of a voltage between the gate and source of the rectification switching element Q2.

The states of periods A to E in FIG. 4 are as follows:

Period A: the Q1 is turned on and the transformer is turned on.

Period B: the choke coil L2 is inverted, the Q1 is turned off, and the transformer is turned on.

Period C: the parasitic diode of the Q3 is conducted.

Period D: the Q1 is turned off and the Q3 is turned on.

Period E: the Q4 is turned on.

As described above, the turn-off of the primary switching element Q1 under the control of the switching control circuit 23 inverts the electromotive voltage of the second coil N12 to invert the voltage at the control terminal of the rectification switching element Q2, thereby turning off the Q2. The control switching element drive circuit 24 turns on the commutation switch turning-off control switching element Q4 in synchronization with the turning-on of the primary switching element Q1. Accordingly, a commutation current flows through a path of L2→Q3→C1→L2.

The turning on and off of the primary switching element Q1 repeats the rectification and the commutation described above.

Direct driving of the commutation switching element Q3 with the fourth coil N14 of the main transformer T1 will cause the gate voltage of the commutation switching element Q3 to be a negative value. However, since the Q3 is indirectly driven by the commutation switch turning-on control switching element Q5 according to the second embodiment of the present invention, as shown in FIG. 4, the gate of the Q3 does not have a negative voltage, thus reducing the driving power of the Q3.

If the commutation switching element Q3 is directly driven with the N14, the driving terminal of the Q3 will be charged to a negative voltage to apply a current to the first coil N11 due to a current flowing through the N14, thereby increasing the switching loss when the primary switching element Q1 is turned on. However, the switching loss of the Q1 can also be reduced in the configuration according to the second embodiment of the present invention.

In addition, since the driving voltage of the commutation switching element Q3 does not exceed the charging voltage of the capacitor C4, it is possible to prevent an excessive voltage from being applied to the gate of the Q3. As a result, an element having a lower gate breakdown voltage can be adopted as the commutation switching element Q3.

Third Embodiment

An example of the configuration of a forward converter with synchronous rectification according to a third embodiment of the present invention will now be described with reference to FIGS. 5 and 6.

Figure 5:
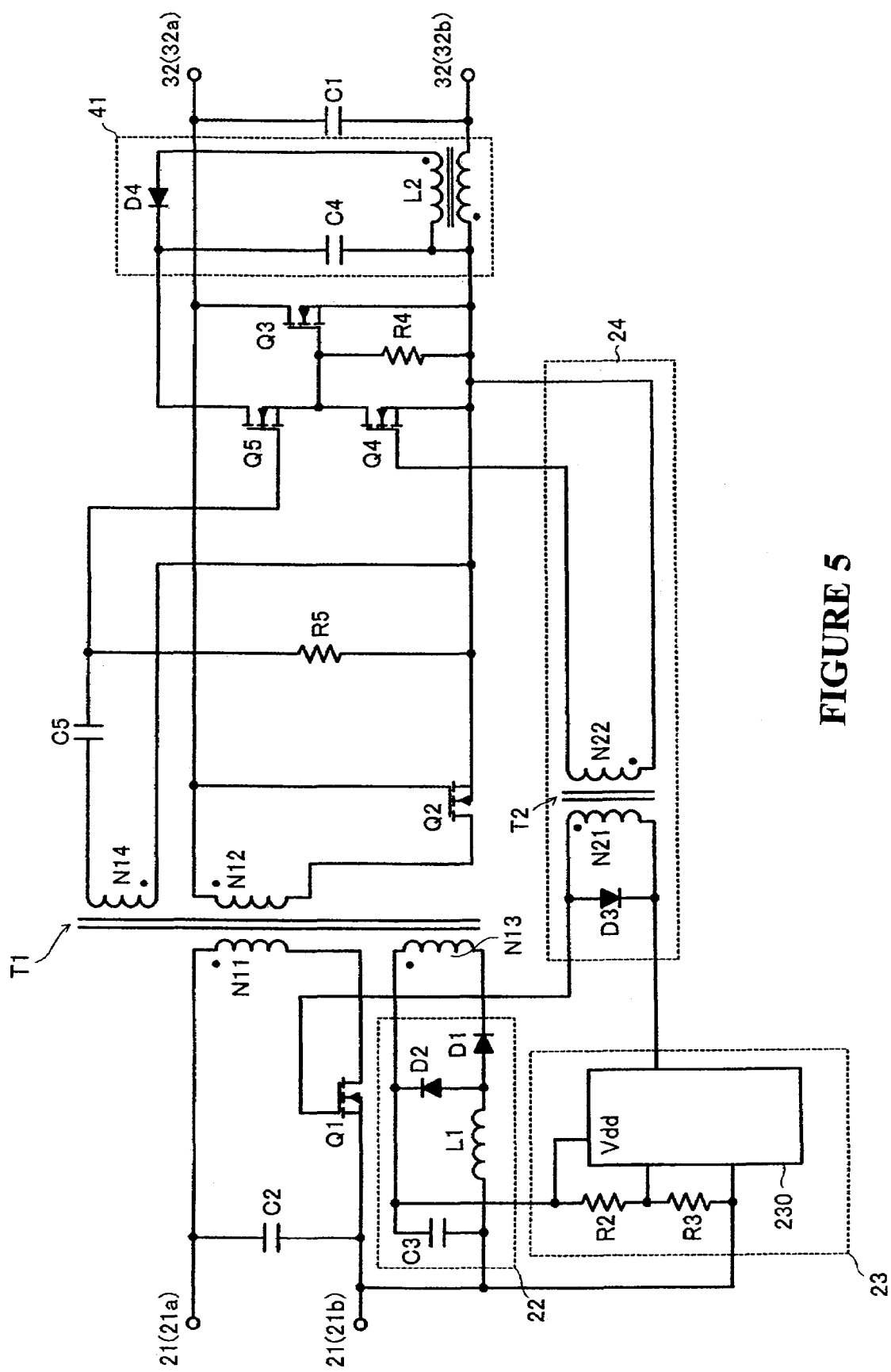
FIG. 5 is a schematic circuit diagram of a forward converter with synchronous rectification according to a third embodiment of the present invention.

FIG. 5 is a schematic circuit diagram of the forward converter with synchronous rectification according to the third embodiment of the present invention. The circuit in FIG. 5 differs from the circuit shown in FIG. 3 in that a differentiation circuit including a capacitor C5 and a resistor R5 is connected to a fourth coil N14 of a main transformer T1 and that an output from the differentiation circuit is connected to the gate of a commutation switch turning-on control switching element Q5. The remaining configuration of the circuit in FIG. 5 is similar to the one shown in FIG. 3.

Driving the commutation switch turning-on control switching element Q5 with a signal resulting from the differentiation of a voltage of the fourth coil N14 can advance the on-timings of the Q5 and a commutation switching element Q3 and can shorten a period during which a current flows through the parasitic diode of the commutation switching element Q3 (particularly, a period during which a strong commutation current begins to flow). As a result, it is possible to reduce any loss caused by the rectification circuit.

Figure 6:
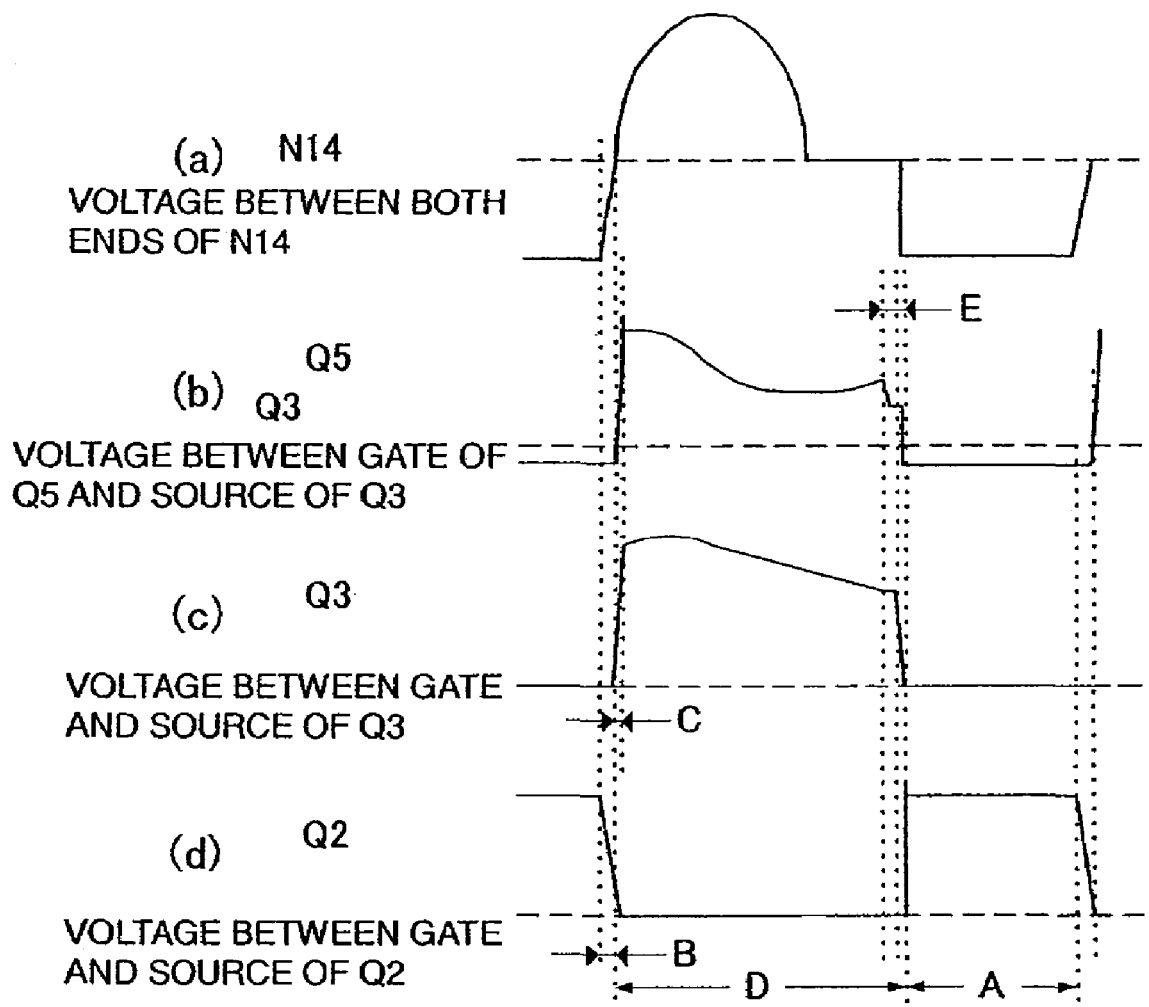
FIG. 6 includes diagrams showing waveforms of the main parts of the converter shown in FIG. 5.

FIG. 6 includes diagrams showing waveforms of the main parts of the forward converter with synchronous rectification shown in FIG. 5.

A graph (a) in FIG. 6 shows the waveform of a voltage between both ends of the fourth coil N14 of the main transformer T1. A graph (b) in FIG. 6 shows the waveform of a voltage between the gate of the Q5 and the source of the Q3. A graph (c) in FIG. 6 shows the waveform of a voltage between the gate and source of the Q3. A graph (d) in FIG. 6 shows the waveform of a voltage between the gate and source of a Q2. The states of periods A to E in FIG. 6 is the same as those of the periods A to E shown in FIG. 4 according to the second embodiment of the present invention.

The waveform of the voltage between the gate of the Q5 and the source of the Q3, shown in (b) in FIG. 6, is given by adding the differentiated waveform of the voltage between both ends of the fourth coil N14 to the waveform of the voltage between the gate and source of the Q3. According to the first embodiment, as shown in FIG. 4, the period C is relatively long during which a current flows through the parasitic diode of the Q3 until the voltage between the gate and source of the commutation switching element Q3 reaches a threshold value of the gate voltage of the Q3. In contrast, according to the third embodiment, the on-period of the parasitic diode of the Q3 can be shortened because the voltage between the gate and source of the Q3 sharply rises as in the waveform example in FIG. 6. Accordingly, it is possible to further reduce any loss.

Fourth Embodiment

An example of the configuration of a forward converter with synchronous rectification according to a fourth embodiment of the present invention will now be described with reference to FIGS. 7 and 8.

Figure 7:
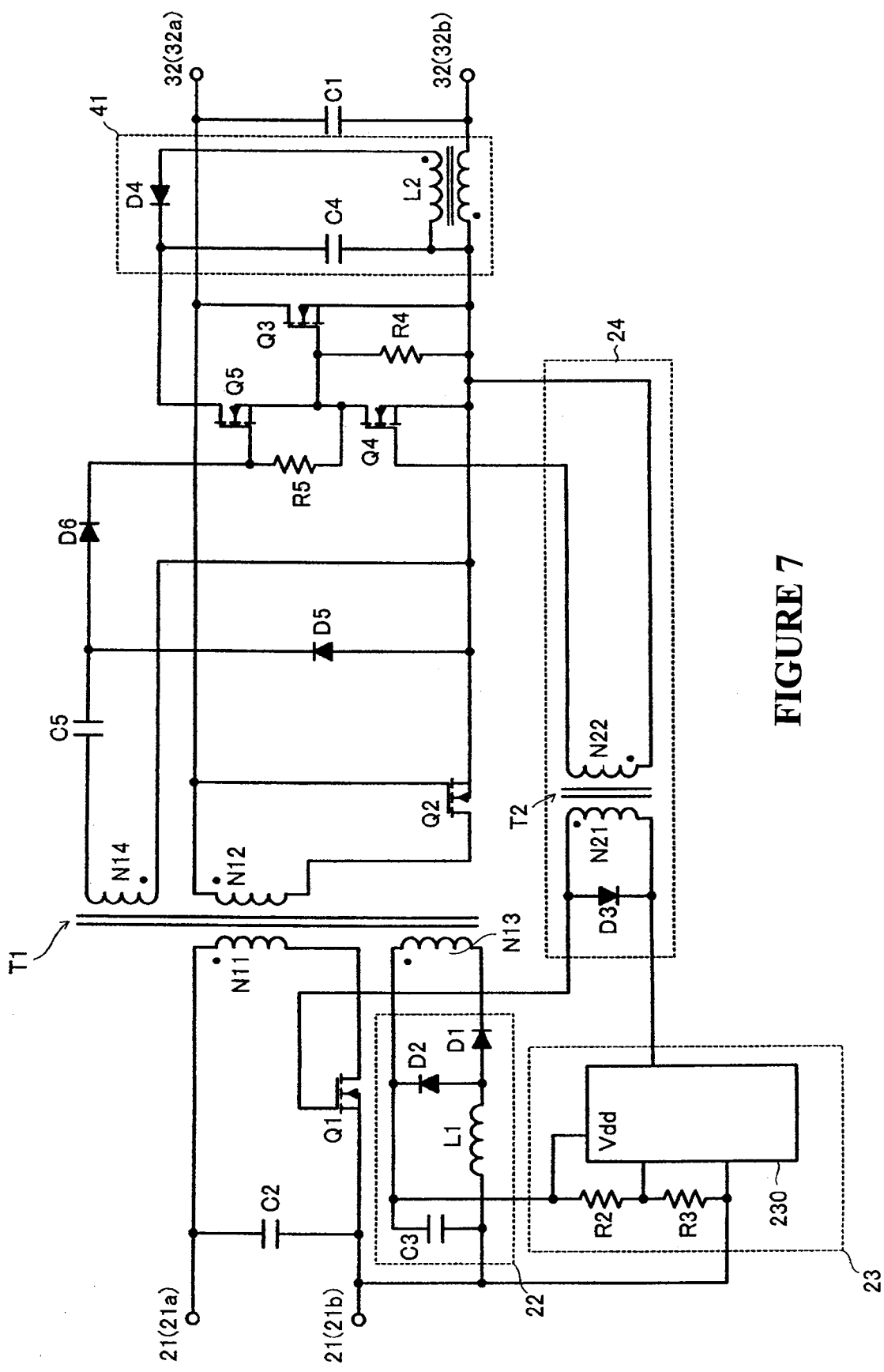
FIG. 7 is a schematic circuit diagram of a forward converter with synchronous rectification according to a fourth embodiment of the present invention.

FIG. 7 is a schematic circuit diagram of the forward converter with synchronous rectification according to the fourth embodiment of the present invention. The circuit in FIG. 7 differs from the circuit shown in FIG. 5 in that a charging circuit including a capacitor C5 and a diode D5 is connected to a fourth coil N14 of a main transformer T1 and that a diode D6 for preventing a reverse-voltage from being applied to the gate of a commutation switch turning-on control switching element Q5 is connected in series to the capacitor C5. The remaining configuration of the circuit in FIG. 7 is similar to the one shown in FIG. 5.

Figure 8A:
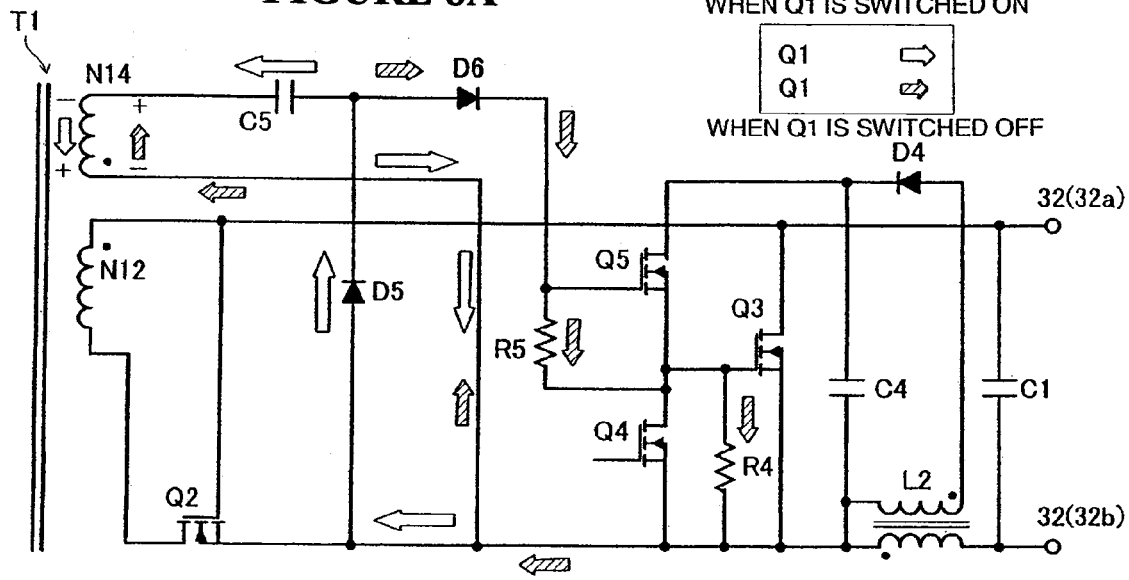
FIG. 8 includes diagrams showing waveforms of the main parts of the converter shown in FIG. 6.

FIG. 8(A) shows current paths when a primary switching element Q1 is turned on and off. Referring to FIG. 8(A), outline arrows represent the directions of a current flowing when the primary switching element Q1 is turned on. The current is used to charge the capacitor C5. Hatched arrows represent a current path when the primary switching element Q1 is turned off. The current is used to apply a voltage given by differentiation of a charging voltage of the C5 and an output voltage of the fourth coil N14 to the gate of the commutation switch turning-on control switching element Q5.

As described above, the capacitor C5 is charged with the current through the diode D5 when the primary switching element Q1 is turned on, and the charged voltage is added to the voltage generated at the fourth coil N14 of the main transformer T1 when the Q1 is turned off. Furthermore, the voltage given by the differentiation of the added voltage is applied to the gate of the commutation switch turning-on control switching element Q5. Accordingly, it is possible to advance the on-timing of a commutation switching element Q3.

A resistor R5 is used to discharge the charge of the capacitance between the gate and source of the commutation switch turning-on control switching element Q5. When a commutation switch turning-off control switching element Q4 is turned on, the gate of the commutation switch turning-on control switching element Q5 is grounded through the resistor R5. After the Q4 is turned on, the charge of the capacitance between the gate and source of the Q5 is immediately discharged to turn off the Q5. Accordingly, the Q4 is not turned on simultaneously with the turning-on of the Q5.

A current loop through a capacitor C4, the Q5, the Q4, and the C4 is supposed in the circuit shown in FIG. 7. If the Q4 is turned on simultaneously with the turning-on of the Q5, a short-circuit current for discharging the capacitance of the capacitor C4 flows to cause problems of any loss and heating of the Q4 and Q5 due to the short-circuit current. However, since the Q5 is not turned on simultaneously with the turning-on of the Q5, as described above, such problems are not caused in circuit according to the fourth embodiment of the present invention.

Figure 8B:
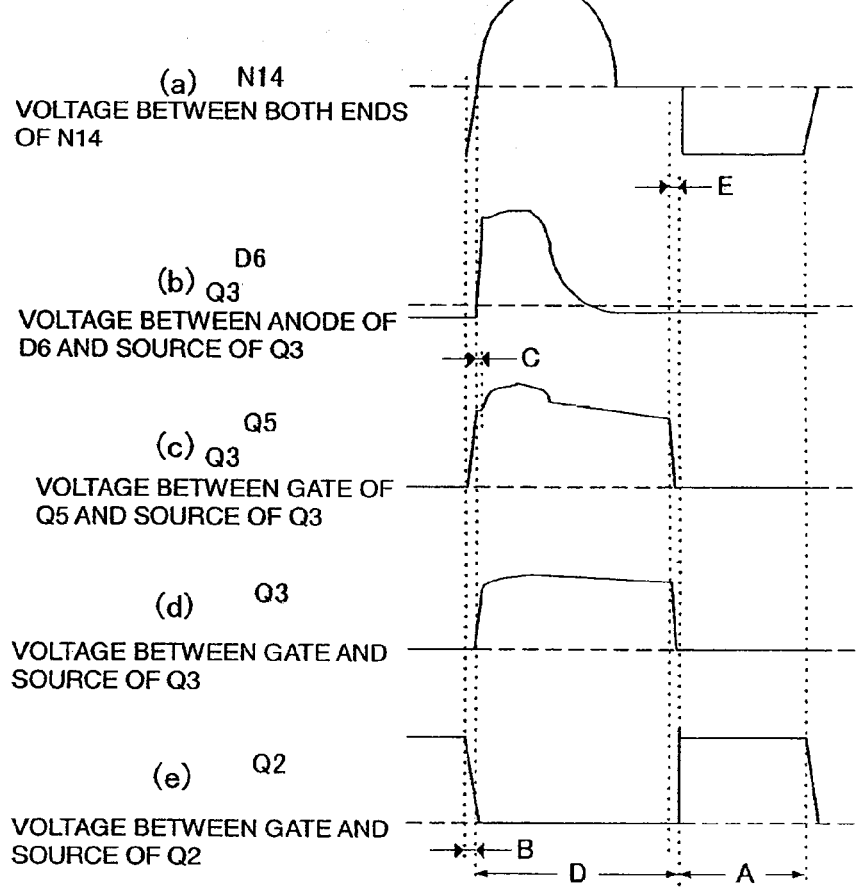

FIG. 8(B) includes diagrams showing waveforms of the main parts of the forward converter with synchronous rectification shown in FIG. 7.

A graph (a) in FIG. 8(B) shows the waveform of a voltage between both ends of the fourth coil N14 of the main transformer T1. A graph (b) in FIG. 8(B) shows the waveform of a voltage between the anode of the diode D6 and the source of the Q3. A graph (c) in FIG. 8(B) shows the waveform of a voltage between the gate of the Q5 and the source of the Q3. A graph (d) in FIG. 8(B) shows the waveform of a voltage between the gate and source of the Q3. A graph (e) in FIG. 8(B) shows the waveform of a voltage between the gate and source of a Q2.

The waveform of the voltage between the anode of the diode D6 and the source of the Q3, shown in (b) in FIG. 8(B), is given by differentiation of the voltage between both ends of the N14. The waveform of the voltage between the gate of the Q5 and the source of the Q3, shown in (c) in FIG. 8(B), is given by peak charging of the differentiated waveform. The states of periods A to E in FIG. 8(B) is the same as those of the periods A to E shown in FIG. 4 according to the second embodiment of the present invention.

Fifth Embodiment

Figure 9:
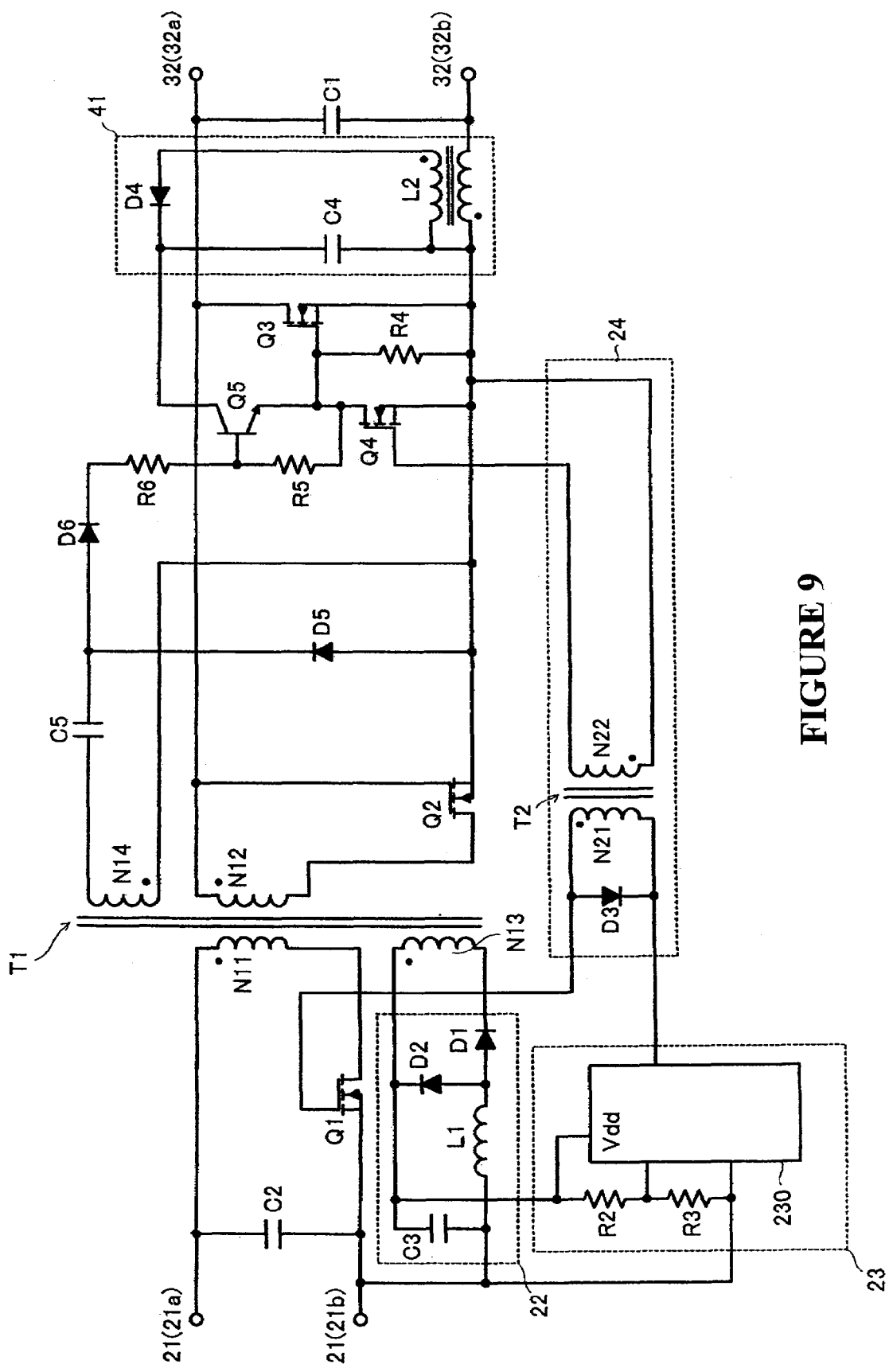
FIG. 9 is a schematic circuit diagram of a forward converter with synchronous rectification according to a fifth embodiment of the present invention.

An example of the configuration of a forward converter with synchronous rectification according to a fifth embodiment of the present invention will now be described with reference to FIG. 9.

A field effect transistor (FET) is used as the commutation switch turning-on control switching element Q5 in the example shown in FIG. 7. In contrast, an NPN transistor is used as a switching element Q5 in the example shown in FIG. 9. In association with the use of the NPN transistor, two resistors R5 and R6 are connected in series between the cathode of the diode D6 and the emitter of the commutation switching element Q5, and the base of the commutation switching element Q5 is connected between the resistor R5 and the resistor R6. The remaining configuration of the circuit in FIG. 9 is similar to the one shown in FIG. 7.

The entire operation of the forward converter with synchronous rectification according to the fifth embodiment of the present invention is similar to that of the forward converter with synchronous rectification according to the fourth embodiment of the present invention. An effect similar to that of the forward converter with synchronous rectification according to the fourth embodiment is achieved in the forward converter with synchronous rectification according to the fifth embodiment of the present invention.

Sixth Embodiment

An example of the configuration of a forward converter with synchronous rectification according to a sixth embodiment of the present invention will now be described with reference to FIGS. 10 and 11.

Figure 10:
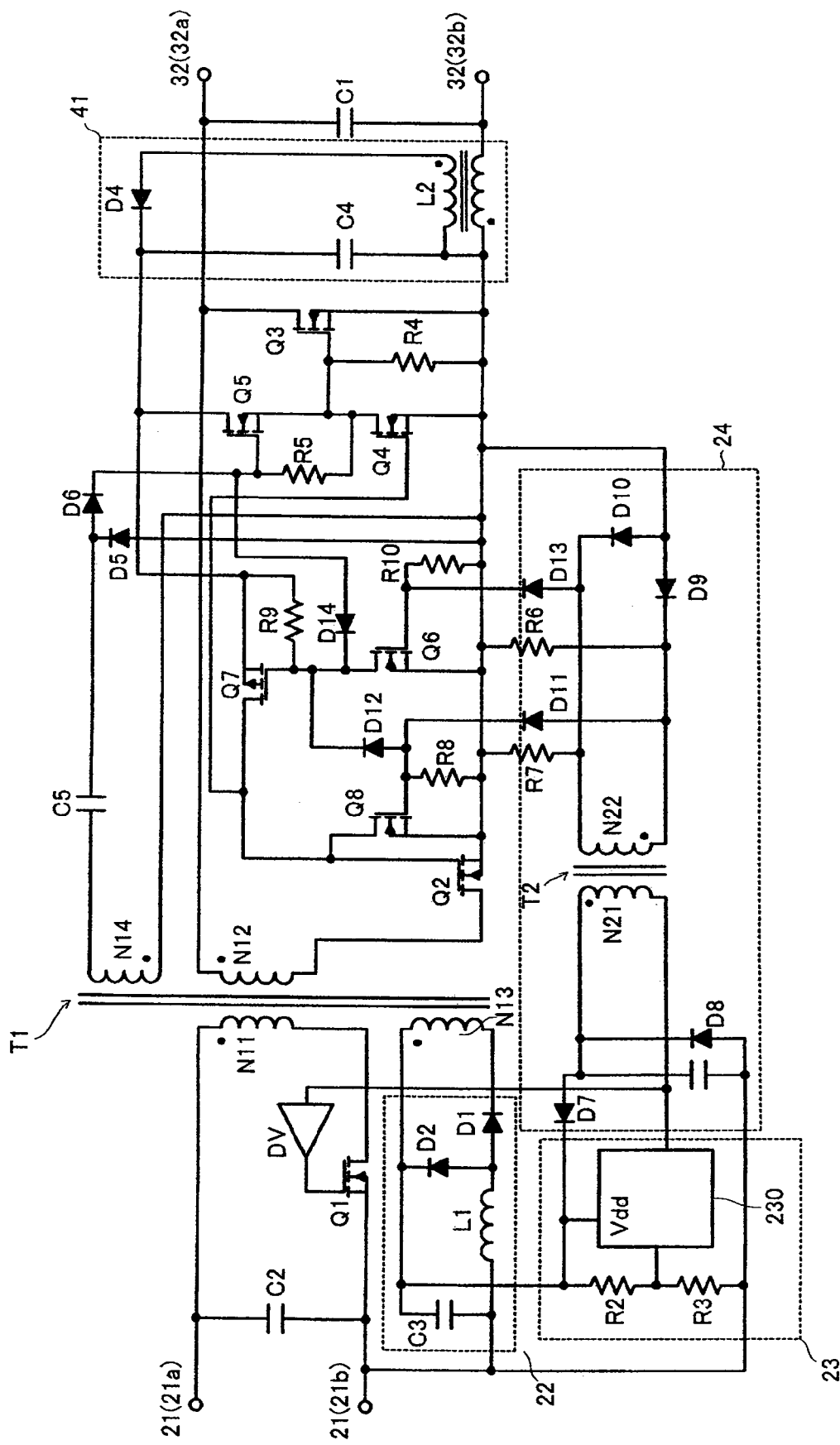
FIG. 10 is a schematic circuit diagram of a forward converter with synchronous rectification according to a sixth embodiment of the present invention.

FIG. 10 is a schematic circuit diagram of the forward converter with synchronous rectification according to the sixth embodiment of the present invention. In the forward converter with synchronous rectification shown in FIG. 10, a single pulse transformer T2 is used to transmit an on-trigger pulse and an off-trigger pulse for a primary switching element Q1 to the secondary side. A diode bridge including diodes D9 and D10 is provided in a second coil N22 of the pulse transformer T2. Diodes D7 and D8 at the primary side reset the excitation when the pulse transformer T2 is turned on and off. According to the sixth embodiment of the present invention, turning on of Q6 and Q7 in response to an on-timing signal of the Q1, output from the pulse transformer T2, applies an output voltage of a commutation switch control voltage generating circuit 41 to the gate of a Q4 to turn on the Q4, unlike the first to fifth embodiments of the present invention.

A connection point between one end of a second coil N22 of the pulse transformer T2 and the cathode of the diode D9 is connected to the gate of a rectification switch control switching element Q8 through a diode D11 for preventing counter flow. A resistor R8 is connected between the gate of the Q8 and the ground. A resistor R7 is connected between the other end of the second coil N22 of the pulse transformer T2 and the ground. The two resistors R7 and R8 are used to adjust a voltage generated at the second coil N22 of the pulse transformer T2 when the off-trigger pulse for the primary switching element Q1 is generated.

A connection point between one end of the second coil N22 of the pulse transformer T2 and the cathode of the diode D10 is connected to the gate of the control switching element Q6 through a diode D13 for preventing counter flow. A resistor R10 is connected between the gate of the Q6 and the ground. A resistor R6 is connected between the other end of the second coil N22 of the pulse transformer T2 and the ground. The two resistors R6 and R10 are used to adjust a voltage generated at the second coil N22 of the pulse transformer T2 when the on-trigger pulse for the primary switching element Q1 is generated.

A diode D12 is connected between the drain of the control switching element Q6 and the gate of the rectification switch control switching element Q8. Since the presence of the diode D12 causes the Q8 to be turned off when the Q6 is turned on (when the Q7 is turned on), it is possible to prevent the Q7 from being turned on simultaneously with the turning on of the Q8 to prevent an increase in loss at the Q8.

The remaining configuration of the circuit in FIG. 10 is similar to the one shown in FIG. 7.

Figure 11:
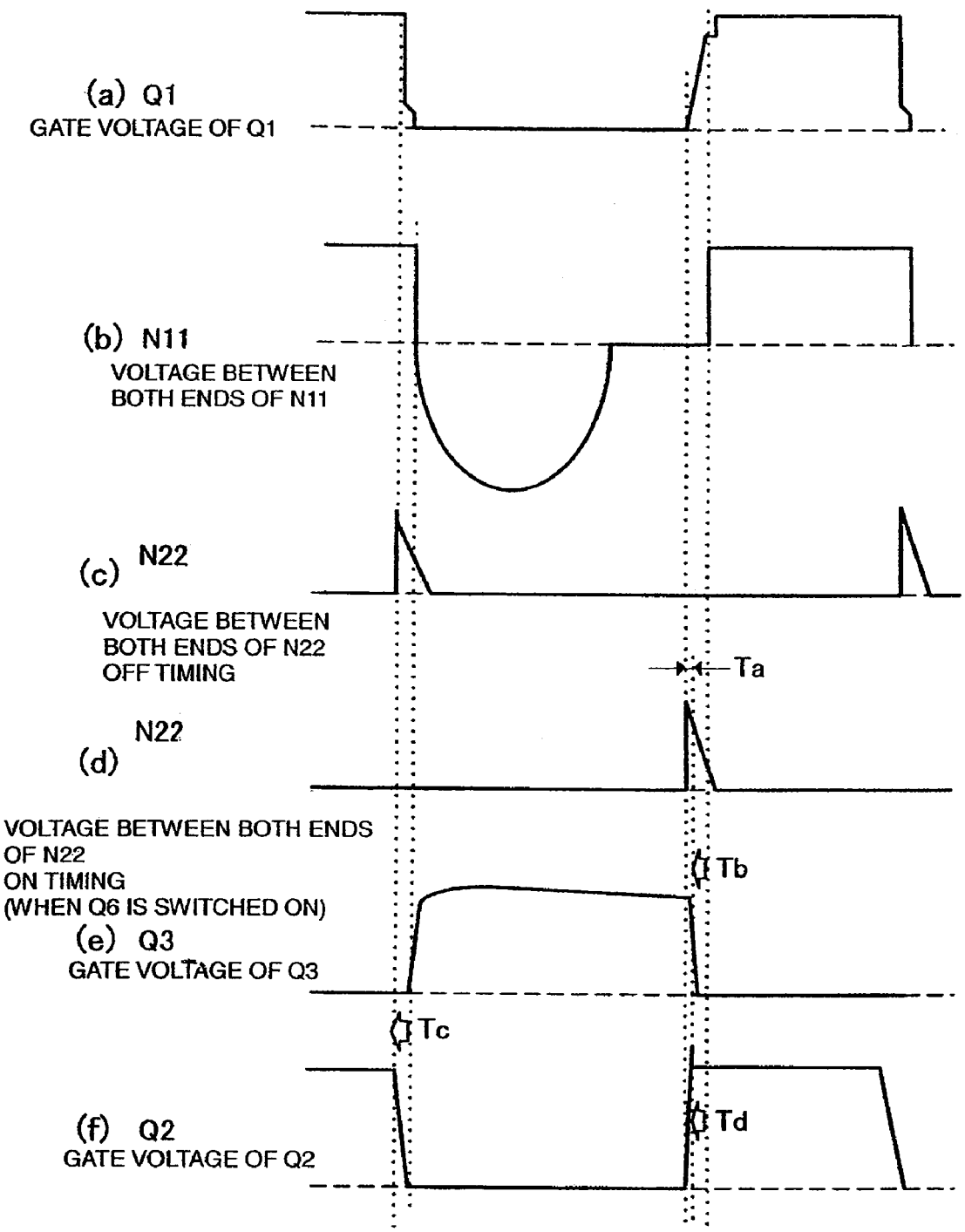
FIG. 11 includes diagrams showing waveforms of the main parts of the converter shown in FIG. 10.

FIG. 11 includes diagrams showing waveforms of the main parts of the forward converter with synchronous rectification shown in FIG. 10. A graph (a) in FIG. 11 shows the waveform of a gate voltage of the primary switching element Q1. A graph (b) in FIG. 11 shows the waveform of a voltage between both ends of a first coil N11 of a main transformer T1. A graph (c) in FIG. 11 shows an off-timing signal in the voltage between both ends of the second coil N22 of the pulse transformer T2. A graph (d) in FIG. 11 shows an on-timing signal (an on-timing signal of the Q6) in the voltage between both ends of the second coil N22 of the pulse transformer T2. A graph (e) in FIG. 11 shows the waveform of a gate voltage of a Q3. A graph (f) in FIG. 11 shows the waveform of a gate voltage of a Q2.

As shown by a time Tb in FIG. 11, the commutation switching element Q3 is turned off in advance of the turning-on of the primary switching element Q1 and a time when the voltage of the main transformer T1 is inverted. As shown by a time Td in FIG. 11, the rectification switching element Q2 is activated before the Q1 rises. In addition, since the primary switching element Q1 is driven through a driver circuit DV as shown in FIG. 10, the Q1 is turned off in advance of the turn-off of the rectification switching element Q2, as shown by a time Tc, thus reducing the switching loss at the Q1. Since the rectification switching element Q2 is turned on in advance of the turning-on of the primary switching element Q1, it is possible to reduce any loss caused by a current flowing through the parasitic diode of the Q4 due to a delay of the turning-on of the Q2 when the voltage between both ends of the main transformer T1 is generated.

Furthermore, since the commutation switch turning-off control switching element Q4 is turned on with a turn-on voltage of the rectification switching element Q2, a simultaneous turning-on of the Q2 and the commutation switching element Q3 does not occur simultaneously with the generation of the voltage between both ends of the main transformer T1, thus preventing the main transformer T1 from being short-circuited. If the gate voltage of the rectification switching element Q2 is applied through the coil (the second coil N12) of the main transformer T1, the above effect of preventing the short-circuit is not achieved because the generation of the voltage at the main transformer T1 occurs simultaneously with the simultaneous turning-on of the Q2 and the Q3 even if the gate of the commutation switch turning-off control switching element Q4 is connected to the gate of the Q2.

Since the gate of a commutation switch turning-on control switching element Q5 is connected to the drain of the control switching element Q6 through a diode D14, the Q6 is turned on with a signal transmitted through the diode D13 when a signal used for turning on the primary switching element Q1 is transmitted to the secondary side through the pulse transformer T2. At this time, the source of the control switching element Q6 is grounded to discharge the capacitance between the gate and source of the commutation switch turning-on control switching element Q5 through the diode D14, thereby turning off the Q5. At the same time, the turning on of the control switching element Q6 turns on the control switching element Q7 and also turns on the rectification switching element Q2 and the commutation switch turning-off control switching element Q4. Accordingly, the commutation switch turning-on control switching element Q5 has been turned off before the commutation switch turning-off control switching element Q4 is turned on, as shown by a time Ta, so that the problem of the simultaneous turning-on of the Q4 and the Q5 is not caused.

Seventh Embodiment

An example of the configuration of a forward converter with synchronous rectification according to a seventh embodiment of the present invention will now be described with reference to FIG. 12.

In the examples according to the second to sixth embodiments of the present invention, the commutation switch control voltage generating circuit 41 is configured so as to rectify and smooth the voltage at the second coil of the choke coil L2 at the secondary side to yield the control voltage for the commutation switching element Q3. In contrast, according to the seventh embodiment of the present invention, a commutation switch control voltage generating circuit 41 having a different configuration is provided in the forward converter with synchronous rectification.

Figure 12:
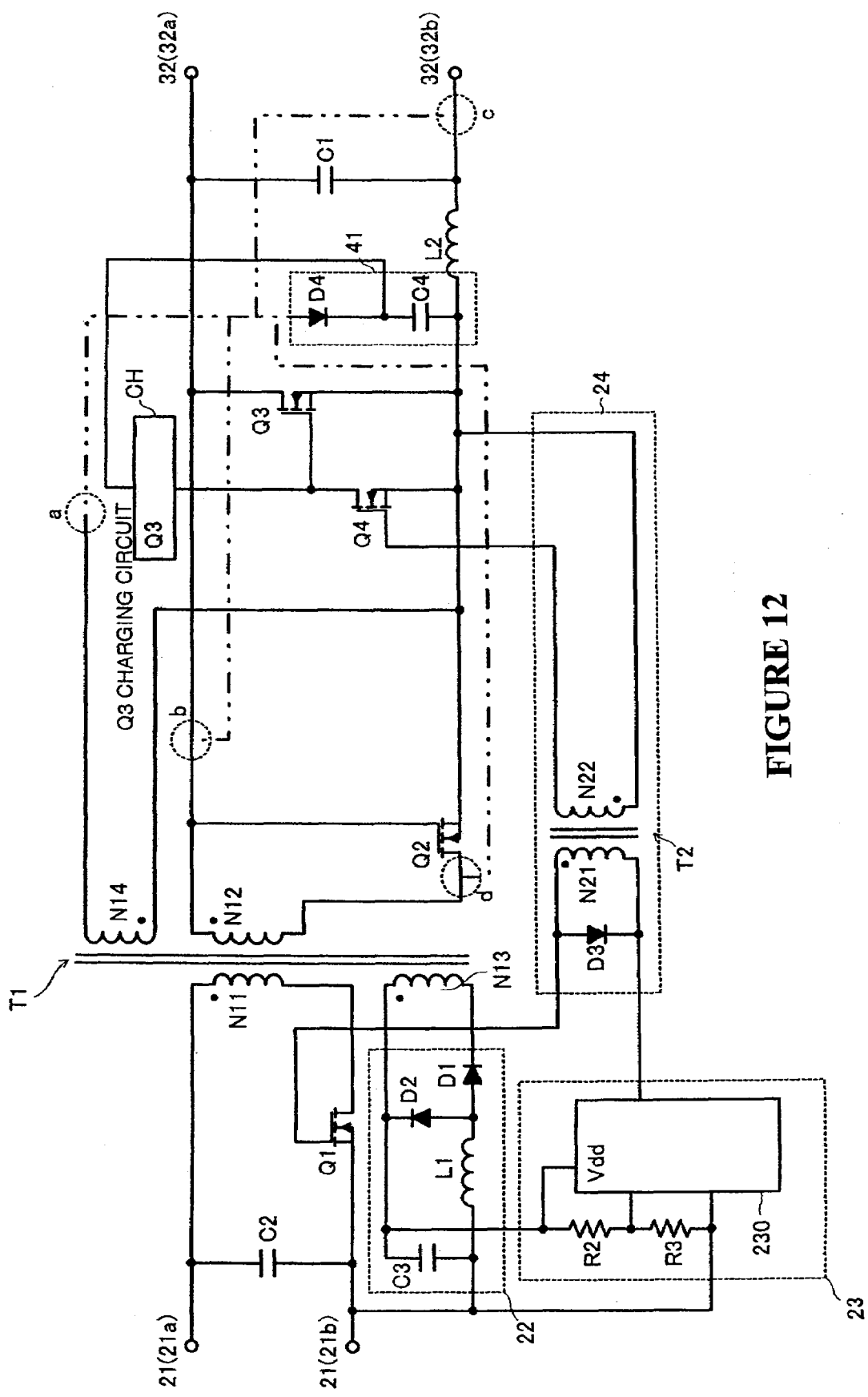
FIG. 12 is a schematic circuit diagram of a forward converter with synchronous rectification according to a seventh embodiment of the present invention.

Referring to FIG. 12, a Q3 charging circuit CH corresponds to the commutation switch turning-on control switching element Q5 connected to the gate of the Q3 according to the second to sixth embodiments of the present invention.

The commutation switch control voltage generating circuit 41 includes a diode D4 and a capacitor C4. A voltage (commutation switching control voltage) to be supplied to the Q3 charging circuit CH can be generated by applying a voltage to the commutation switch control voltage generating circuit 41 from any of points a, b, c, and d in FIG. 12.

A voltage charged in the capacitor C4 in the commutation switch control voltage generating circuit 41 may be increased by a voltage regulator.

A diode rectifier circuit may be provided at the output of a coil (for example, a second coil N12) of a main transformer T1 or another coil to configure a power supply circuit.

A voltage from an output terminal 32 may be applied to configure another power supply circuit.

Although the present invention has been described in relation to particular embodiments thereof, many other variations and modifications and other uses will become apparent to those skilled in the art. Therefore, the present invention is not limited by the specific disclosure herein.

What is claimed is:

1. A forward converter with synchronous rectification including a transformer including a first coil and a second coil, a primary switching element connected in series to the first coil of the transformer, a choke coil connected in series to the second coil of the transformer, a smoothing capacitor connected in parallel between output terminals, a rectification switching element that is connected in series to the second coil of the transformer and that is turned on or off in synchronization with turning on or off of the primary switching element, a commutation switching element that is turned off or on in synchronization with the turning on or off of the primary switching element and that serves as a path through which an excitation energy of the choke coil is released when the commutation switching element is turned on, and a switching control circuit controlling switching of the primary switching element, the forward converter with synchronous rectification comprising:

a commutation switch control voltage generating circuit that generates a control voltage for the commutation switching element;

a commutation switch turning-on control switching element that is controlled with a voltage generated at an auxiliary coil of the transformer and that controls application of the control voltage to a control terminal of the commutation switching element;

a commutation switch turning-off control switching element that is connected to the control terminal of the commutation switching element and, when the commutation switch turning-off control switching element is turned on, controls a voltage at the control terminal of the commutation switching element to turn off the commutation switching element; and a control switching element drive circuit that transmits an on-timing signal for the primary switching element from the first side of the transformer to the second side thereof in an insulated state and that turns on the commutation switch turning-off control switching element in response to the on-timing signal for the primary switching element, transmitted to the second side.

2. The forward converter with synchronous rectification according to claim 1, further comprising a driving voltage adjustment capacitor connected in series between the auxiliary coil of the transformer and the commutation switch turning-on control switching element.

3. The forward converter with synchronous rectification according to claim 1, further comprising a differentiation circuit that includes a capacitor and a resistor and that is connected to the auxiliary coil of the transformer, an output from the differentiation circuit being connected to a control terminal of the commutation switch turning-on control switching element.

4. The forward converter with synchronous rectification according to claim 3, further comprising a charging circuit that includes the capacitor and a diode and that is connected to the auxiliary coil of the transformer, wherein a diode for preventing application of a reverse voltage to the control terminal of the commutation switch turning-on control switching element is connected in series to the capacitor.

5. The forward converter with synchronous rectification according to claim 4, further comprising:

a rectification switching element turning-on control switching element connected between an output of the commutation switch control voltage generating circuit and a control terminal of the rectification switching element;

a switching element for applying a turn-on signal to a control terminal of the rectification switching element turning-on control switching element when the primary switching element is turned on, the switching element being connected to the control terminal of the rectification switching element turning-on control switching element; and a diode for discharging the charge of a parasitic capacitance generated at the commutation switch turning-on control switching element, the diode being connected between the control terminal of the commutation switch turning-on control switching element and the control terminal of the rectification switching element turning-on control switching element.

* * * * *